(12) United States Patent
Peterson et al.

(10) Patent No.: US 11,354,498 B2
(45) Date of Patent: Jun. 7, 2022

(54) DISPLAYING EDITS FOR A USER'S PORTION OF A SHARED DOCUMENT

(71) Applicant: LENOVO (Singapore) PTE. LTD., New Tech Park (SG)

(72) Inventors: Nathan J. Peterson, Oxford, NC (US); Russell Speight VanBlon, Raleigh, NC (US); John Carl Mese, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/738,556

(22) Filed: Jan. 9, 2020

(65) Prior Publication Data

US 2021/0216704 A1     Jul. 15, 2021

(51) Int. Cl.

| | |
|---|---|
| *G06F 40/166* | (2020.01) |
| *G06F 40/197* | (2020.01) |
| *G06F 16/93* | (2019.01) |
| *G06F 3/0484* | (2022.01) |
| *G06F 40/117* | (2020.01) |

(52) U.S. Cl.
CPC .......... *G06F 40/197* (2020.01); *G06F 3/0484* (2013.01); *G06F 16/93* (2019.01); *G06F 40/117* (2020.01); *G06F 40/166* (2020.01)

(58) Field of Classification Search
CPC .......... G06F 40/00; G06F 16/80; G06F 3/048; G06F 40/197; G06F 3/0484; G06F 16/93; G06F 40/166; G06F 40/117
See application file for complete search history.

(56) References Cited

U.S. PATENT DOCUMENTS

| | | | | |
|---|---|---|---|---|
| 2012/0233137 A1* | 9/2012 | Jakobson | ............ | G06F 40/197 707/695 |
| 2012/0284344 A1* | 11/2012 | Costenaro | ............ | G06F 40/197 709/206 |
| 2015/0052427 A1* | 2/2015 | Vagell | ................... | G06F 40/166 715/256 |
| 2020/0162561 A1* | 5/2020 | Milvaney | ............ | G06F 40/166 |

* cited by examiner

*Primary Examiner* — Sanchita Roy
(74) *Attorney, Agent, or Firm* — Kunzler Bean & Adamson (57) ABSTRACT

Apparatuses, methods, systems, and program products are disclosed for displaying edits for a user's portion of a shared document. An apparatus includes a processor and a memory that stores code executable by the processor. The code is executable by the processor to receive a selection of a user who has contributed to a document that is editable by a plurality of users. The code is executable by the processor to determine portions of the selected user's contributions to the document that have been edited by other users of the plurality of users. The code is executable by the processor to visually indicate the edits made to the portions of the selected user's contributions to the document.

20 Claims, 5 Drawing Sheets

DISPLAYING EDITS FOR A USER'S PORTION OF A SHARED DOCUMENT

FIELD

The subject matter disclosed herein relates to document editors and more particularly relates to displaying edits to a user's portion of a shared document.

BACKGROUND

Document editors may allow shared or collaborative editing of the document among a plurality of users. When a user edits a shared document, the edits may be tracked so that other users can see the changes that were made. Sometimes, however, a user may be interested in viewing edits that modified content that they contributed rather than seeing all the edits that were made to the document.

BRIEF SUMMARY

Apparatuses, methods, systems, and program products are disclosed for displaying edits for a user's portion of a shared document. An apparatus, in one embodiment, includes a processor and a memory that stores code executable by the processor. In certain embodiments, the code is executable by the processor to receive a selection of a user who has contributed to a document that is editable by a plurality of users. In some embodiments, the code is executable by the processor to determine portions of the selected user's contributions to the document that have been edited by other users of the plurality of users. In various embodiments, the code is executable by the processor to visually indicate the edits made to the portions of the selected user's contributions to the document.

A method for displaying edits for a user's portion of a shared document, in one embodiment, includes receiving, by a processor, a selection of a user who has contributed to a document that is editable by a plurality of users. The method, in one embodiment, includes determining portions of the selected user's contributions to the document that have been edited by other users of the plurality of users. In further embodiments, the method includes visually indicating the edits made to the portions of the selected user's contributions to the document.

A computer program product for displaying edits for a user's portion of a shared document, in one embodiment, includes a computer readable storage medium having program instructions embodied therewith. In certain embodiments, the program instructions are executable by a processor to cause the processor to receive a selection of a user who has contributed to a document that is editable by a plurality of users. In further embodiments, the program instructions are executable by a processor to cause the processor to determine portions of the selected user's contributions to the document that have been edited by other users of the plurality of users. In one embodiment, the program instructions are executable by a processor to cause the processor to visually indicate the edits made to the portions of the selected user's contributions to the document.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to receive a selection of a user who has contributed to a document that is editable by a plurality of users. In some embodiments, the code is executable by the processor to determine portions of the selected user's contributions to the document that have been edited by other users of the plurality of users. In various embodiments, the code is executable by the processor to visually indicate the edits made to the portions of the selected user's contributions to the document.

In one embodiment, the selected user's contributions comprise one or more of content that the selected user originated and edits that the selected user made to content that other users originated. In further embodiments, the code is executable by the processor to visually indicate every edit that is made to the portions of the selected user's contributions to the document since the selected user made the contributions to the document.

In one embodiment, the code is executable by the processor to present a history of edits that have been made to a portion of the selected user's contributions to the document. The historical edits may be presented in an order in which the edits were made. In further embodiments, the code is executable by the processor to receive a selection of an historical edit and visually indicate the selected historical edit made to the portion of the selected user's contributions to the document.

In one embodiment, the code is executable by the processor to visually indicate each of one or more edits that have been made to the portion of the selected user's contributions to the document since the selected historical edit. In some embodiments, the history of edits comprises a time stamp associated with each of the edits indicating when each edit was made to the portion of the selected user's contributions to the document.

In one embodiment, the code is executable by the processor to receive a selection of one or more users who edited a portion of the selected user's contributions to the document and visually indicate the edits made to the portions of the selected user's contributions to the document by the selected one or more users. In further embodiments, the portions of the selected user's contributions to the document are selected from the group consisting of the document, one or more pages, one or more paragraphs, one or more sentences, and one or more user-selected portions of the document.

In one embodiment, the code is executable by the processor to tag a user-selected portion of the document as a portion to monitor and send a notification in response to detecting an edit made to the tagged user-selected portion of the document. In further embodiments, the code is executable by the processor to automatically tag one or more portions of the document as portions to monitor in response to a user interacting with the one or more portions a threshold amount and send a notification in response to detecting an edit made to the tagged one or more portions of the document.

In one embodiment, the code is executable by the processor to, in response to the selection of the user, hide portions of the document that do not comprise the selected user's contributions from view until the selected user is no longer selected. In further embodiments, the code is executable by the processor to integrate with a graphical word processing program and present one or more graphical interface elements within the word processing program for performing functions of the apparatus. In certain embodiments, the edits made to the portions of the selected user's contributions to the document are visually indicated by one or more of a font color, a font style, a tool tip, a highlight, a list, and a pop up window.

A method for displaying edits for a user's portion of a shared document, in one embodiment, includes receiving, by a processor, a selection of a user who has contributed to a document that is editable by a plurality of users. The method, in one embodiment, includes determining portions of the selected user's contributions to the document that have been edited by other users of the plurality of users. In further embodiments, the method includes visually indicating the edits made to the portions of the selected user's contributions to the document.

In one embodiment, the method includes visually indicating every edit that is made to the portions of the selected user's contributions to the document since the selected user made the contributions to the document. In some embodiments, the method includes presenting a history of edits that have been made to a portion of the selected user's contributions to the document. The historical edits may be presented in an order in which the edits were made. In some embodiments, the method includes receiving a selection of an historical edit and visually indicating the selected historical edit made to the portion of the selected user's contributions to the document.

In one embodiment, the method includes visually indicating each of one or more edits that have been made to the portion of the selected user's contributions to the document since the selected historical edit. In further embodiments, the method includes receiving a selection of one or more users who edited a portion of the selected user's contributions to the document and visually indicating the edits made to the portions of the selected user's contributions to the document by the selected one or more users. In various embodiments, the method includes automatically tagging one or more portions of the document as portions to monitor in response to a user interacting with the one or more portions a threshold amount and sending a notification in response to detecting an edit made to the tagged one or more portions of the document.

A computer program product for displaying edits for a user's portion of a shared document, in one embodiment, includes a computer readable storage medium having program instructions embodied therewith. In certain embodiments, the program instructions are executable by a processor to cause the processor to receive a selection of a user who has contributed to a document that is editable by a plurality of users. In further embodiments, the program instructions are executable by a processor to cause the processor to determine portions of the selected user's contributions to the document that have been edited by other users of the plurality of users. In one embodiment, the program instructions are executable by a processor to cause the processor to visually indicate the edits made to the portions of the selected user's contributions to the document.

Figure 1:
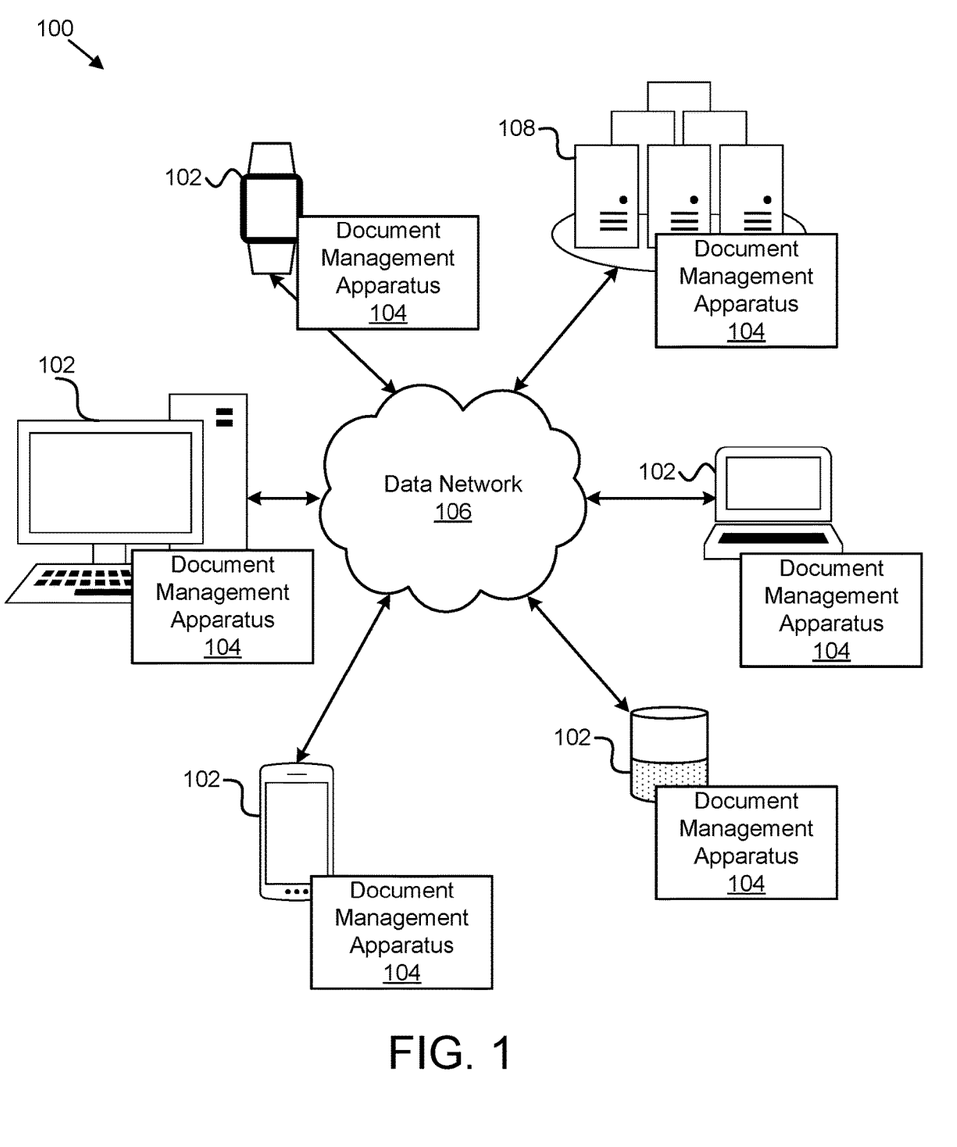
FIG. 1 is a schematic block diagram illustrating one embodiment of a system for displaying edits for a user's portion of a shared document.

FIG. 1 is a schematic block diagram illustrating one embodiment of a system 100 for displaying edits for a user's portion of a shared document. In one embodiment, the system 100 includes one or more information handling devices 102, one or more document management apparatuses 104, one or more data networks 106, and one or more servers 108. In certain embodiments, even though a specific number of information handling devices 102, document management apparatuses 104, data networks 106, and servers 108 are depicted in FIG. 1, one of skill in the art will recognize, in light of this disclosure, that any number of information handling devices 102, document management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In one embodiment, the document management apparatus 104 is configured to receive a selection of a user who has contributed to a document. The document may be a shared document that can be edited by a plurality of different users in collaboration. In further embodiments, the document management apparatus 104 is configured to determine portions of the selected user's contributions to the document that have been edited by other users of the plurality of users and visually indicate the edits made to the portions of the selected user's contributions to the document. The document management apparatus 104, including its various sub-modules, may be located on one or more information handling devices 102 in the system 100, one or more servers 108, one or more network devices, and/or the like. The document management apparatus 104 is described in more detail below with reference to FIGS. 2 and 3.

In various embodiments, the document management apparatus 104 may be embodied as a hardware appliance that can be installed or deployed on an information handling device 102, on a server 108, on a user's mobile device, on a display, or elsewhere on the data network 106. In certain embodiments, the document management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the document management apparatus 104 may include a power interface, a wired and/or wireless network interface, a graphical interface that attaches to a display, and/or a semiconductor integrated circuit device as described below, configured to perform the functions described herein with regard to the document management apparatus 104.

The document management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the document management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the document management apparatus 104.

The semiconductor integrated circuit device or other hardware appliance of the document management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the document management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

The servers 108 may comprise cloud servers, remote servers, central servers, and/or the like that host documents such as word processing documents, spreadsheets, slide show presentations, design/drafting files (e.g., CAD files), multimedia editing files, and/or the like that are accessible and editable by a plurality of different users. The plurality of users may work collaboratively on the documents by adding new content, removing existing content, editing or modifying existing content, and/or the like. The users may be located in different geographical locations, different physical locations (e.g., different locations within the same building/office), and/or the like.

Figure 2:
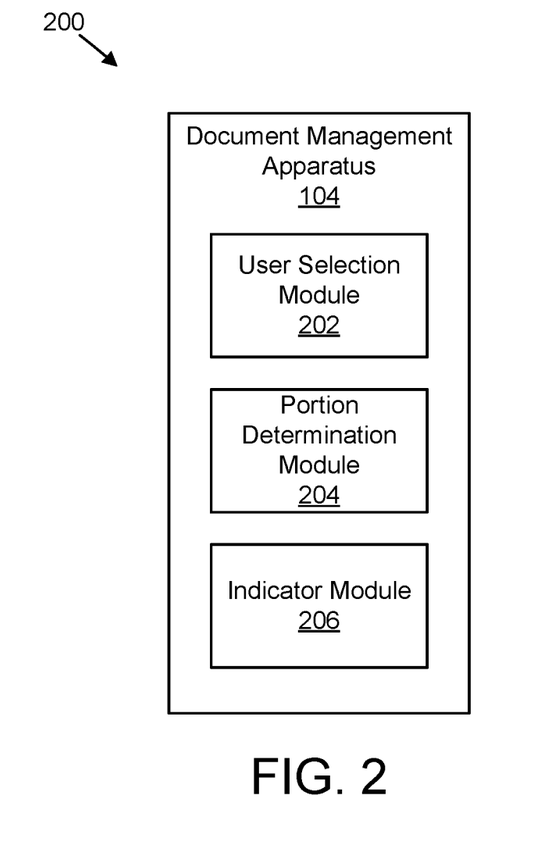
FIG. 2 is a schematic block diagram illustrating one embodiment of an apparatus for displaying edits for a user's portion of a shared document.

FIG. 2 is a schematic block diagram illustrating one embodiment of an apparatus 200 for displaying edits for a user's portion of a shared document. In one embodiment, the apparatus 200 includes an instance of a document management apparatus 104. In one embodiment, the document management apparatus 104 includes one or more of a user selection module 202, a portion determination module 204, and an indicator module 206, which are described in more detail below.

In one embodiment, the user selection module 202 is configured to receive a selection of a user who has contributed to a document that is editable by a plurality of users. The document may be editable simultaneously by the users or asynchronously (one at a time) by the users. The document may be hosted at a central server, cloud server, or the like so that users can access and edit the document regardless of where the users are located. The document may comprise a text document, a source code file, a spreadsheet, a slide show presentation, and/or the like.

In one embodiment, a user may want to view edits or modifications that have been made to content that they have contributed or that other users have contributed. The user selection module 202 may present a list of users who have contributed content and/or edits to the document. For example, the user selection module 202 may present a flat list, a drop down list, and/or the like of users who have contributed to the document. The user selection module 202 may receive a selection of one or more users from the list. The selected user's contributions to the document may include content that the selected user originated and/or edits that the selected user made to content that other users originated.

In one embodiment, the portion determination module 204 is configured to determine portions of the selected user's contributions to the document that have been edited by other users of the plurality of users. For instance, the portion determination module 204 may determine parts of the document that the selected user contributed and that have been subsequently edited such as the document as a whole, one or more pages of the document, one or more paragraphs of the document, one or more sentences within the document, one or more user-selected portions of the document, and/or the like. The user-selected portions of the document may include selected pages, selected paragraphs, selected sentences, selected lines, and/or other selected text, cells, slides, and/or the like of the document.

In such an embodiment, the portion determination module 204 may track and record which users contribute original, unedited content and/or edit existing content, the content that the users contribute, a timestamp indicating when the user contributed the content, and/or the like. In this manner, the portion determination module 204 can reference the content that the selected user contributed and determine whether the user's contributions have been subsequently edited, changed, or modified by other users.

In one embodiment, the indicator module 206 is configured to visually indicate the edits made to the portions of the selected user's contributions to the document. For instance, the indicator module 206 may visually indicate the edited portions of the user's contributions to the document by using a font color, a font style, a tool tip, a highlight, a list, a pop up window, and/or the like. Furthermore, if there are multiple different edits to the same portion of the user's content, each edit may have a different visual indicator (e.g., color, font style/size, or the like).

Moreover, the indicator module 206 may present an indicator of the user or users who edited a particular portion of the user's contributions to the content. The indicator may include a username and a date of when the edit was made. The indicator may be presented in a tool tip or pop up window such that when the user hovers over the edited portion, the tool tip will be displayed. The indicator module 206 may further present the original content and then the subsequent users' edits to the original content so that the user can see how the content has changed over time from its original state.

In this manner, the document management apparatus 104 allows a user to see how his/her contributions, or other user's contributions, to the document, e.g., original and edited content, have changed over time and by whom, in a shared document that allows multiple users to edit and work on the document together. As described in more detail below, the document management apparatus 104 may be embodied as a plugin or extension for a web browser for use in editing web-based shared documents such as Google Docs®, or as part of an editing feature of a desktop application such as the "track changes" feature in Microsoft Word®. Accordingly, the document management apparatus 104 may act as a filter for the editing feature so that instead of seeing every edit that every user has made to a document, the document can be filtered to display edits that have been made to a selected users' content such that only edits made to the selected user's content in the document are highlighted.

Figure 3:
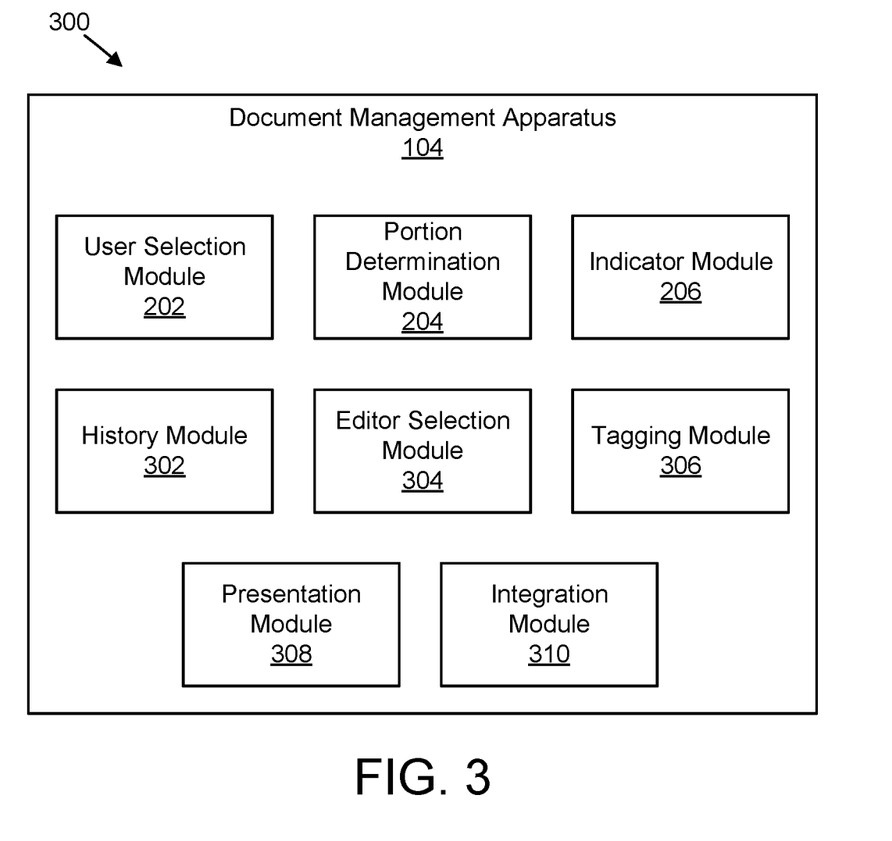
FIG. 3 is a schematic block diagram illustrating one embodiment of another apparatus for displaying edits for a user's portion of a shared document.

FIG. 3 is a schematic block diagram illustrating one embodiment of another apparatus 300 for displaying edits for a user's portion of a shared document. In one embodiment, the apparatus 300 includes an instance of a document management apparatus 104. The document management apparatus 104, in certain embodiments, includes a user selection module 202, a portion determination module 204, and an indicator module 206, which may be substantially similar to the user selection module 202, the portion determination module 204, and the indicator module 206 described above with reference to FIG. 2. The input management module 104, in further embodiments, includes one or more of a history module 302, an editor selection module 304, a tagging module 306, a presentation module 308, and an integration module 310, which are described in more detail below.

In one embodiment, the history module 302 is configured to present a history of edits that have been made to a portion of the selected user's contributions to the document. The history module 302, for instance, may track and record when edits are made to content in the document, including the user who made the edit and the time/date in which the edit was made. The history module 302 may record the original content, the edited content, and the difference between the original and edited content so that the changes can be tracked on a per-edit basis for a portion of the selected user's contributed content.

In one embodiment, the history module 302 presents the historical edits for a portion of the user's contributed content in an order in which the edits were made. For instance, the history module 302 may present a list, e.g., in a pop-up window, of the edits that were made to a user's original paragraph in the order in which the edits were made, e.g., in chronological order. The list may include the user(s) who made the edits, the time/date that the edits were made, and/or the like.

In one embodiment, the history module 302 receives a selection of an historical edit and the indicator module 206 and/or the history module 302 visually indicates within the document the edit. For example, if selected historical edit is for a change to a sentence of text, the indicator module 206 may show the original text in one font color and the changed text in a different font color in line with the original text with additions to the original text being underlined and deletions from the original text being shown with strike-through so that the user can easily see the changes between the original text and the edited text. In certain embodiments, the history module 302 may present a pop-up window, a tooltip, and/or the like that shows what changed between the original content and the selected historical edit of the content.

In certain embodiments, the indicator module 206 visually indicates, dynamically in real-time, the changes to the selected user's content as the user hovers over the list of historical changes. For example, the color or font or style of changed text may dynamically update within the portion of the selected user's text that has been changed as the user hovers over each historical edit for the portion of the selected user's contributions that have been edited. In this manner, the user can go back and view different versions of the selected user's portions of the document that have been edited and easily see what has changed between different versions.

In certain embodiments, the history module 302 may maintain an edit history for different portions of the selected user's contributions to the document. For instance, the history module 302 may track and record edits to the selected user's contributions at a word level, at a sentence level, at a paragraph level, at a page level, at a document level, at a slide level, at a slide show level, at a cell level, at a spreadsheet level, at a workbook level, and/or the like to provide the user with different granularities of changes that can be viewed.

In one embodiment, the indicator module 206 visually indicate every historical edit that is made to the portions of the selected user's contributions to the document since the selected user made the contributions to the document. In such a manner, the indicator module 206 may use various combinations of text colors, background colors, highlights, font styles, and/or the like to illustrate the different edits that have been made to the selected user's portions of the document since the selected user made his/her contribution to the document.

In some embodiments, the indicator module 206 may provide a graphical indicator for each edit, e.g., a footnote, and the history module 302 may provide a list of historical edits that corresponds to the graphical indicators, e.g., in a comment box that is presented adjacent to the selected user's portion of the document, a pop-up window, and/or the like.

In one embodiment, the editor selection module 304 is configured to receive a selection of one or more users who edited a portion of the selected user's contributions to the document. In certain embodiments, the editor selection module 304 presents a list of editors who have modified or changed the selected users original contribution to the document such that one or more editors can be selected from the list to filter the edits that have been made to the selected user's portions of the document to only show edits made by the selected users.

For instance, if users A, B, and C made changes to a paragraph that the selected user originally added to the document, the editor selection module 304 may present a list that includes users A, B, and C as users who made edits to the paragraph. If the editor selection module 304 receives a selection of users A and B, the indicator module 206 may only visually highlight or indicate changes to the paragraph that users A and B made and/or the history module 302 may filter the list of edits that have been made to the paragraph to only include edits by users A and B. In certain embodiments, the editor selection module 304 presents a list of editors as part of the list of historical edits that the history module 302 presents such that the list of historical edits can be filtered by one or more selected editors.

In one embodiment, the tagging module 306 is configured to tag a user-selected portion of the document as a portion to monitor. In one embodiment, a user can tag a portion of the document, e.g., a paragraph, a sentence, a selection of text, and/or the like to monitor such that when changes are made to the selected portion of the document, the tagging module 306 sends a notification to the user to inform the user that the tagged portion of the document has been edited. The notification may include at least a portion of the edited content, the user who made the edit, a timestamp for the edit, and/or the like.

In one embodiment, the tagging module 306 may tag an editor or other user who can edit the document such that when the other user makes a change in the document, e.g., adds content, removes content, or edits existing content, a notification is sent to the user who selected to tag the users. In this manner, users can receive real-time updates when tagged portions of the document are edited or when users of interest make changes to the document.

In one embodiment, the tagging module 306 automatically tags portions of the document for a user based on the user's interactions with the document. For example, if a user has made a threshold number of edits to a portion of a document, e.g., a paragraph, the tagging module 306 may tag the paragraph such that when other users make changes to the paragraph, the user will be notified of the changes in real-time. Similarly, if a user contributes new content to the document, the tagging module 306 may automatically tag the user-added content so that if the content is edited by a different user, the user will be notified of the edit.

In one embodiment, the presentation module 308 is configured to, in response to the selection of the user, hide portions of the document that do not comprise the selected user's contributions from view until the selected user is no longer selected. For example, if the user selection module 202 receives a user selection for user A, the presentation module 308 may hide portions of the document that do not include user A's contributions—either original content the user A added to the document or content that user A added as an edit to existing content. In this manner, the presentation module 308 can make it easier to find and view a selected user's contributions, especially in large documents, and the edits that may have been made to the selected user's contributions to the document.

In one embodiment, the integration module 310 is configured to integrate with a graphical word processing program and present one or more graphical interface elements within the word processing program for performing various functions described above. For instance, the integration module 310 may use an API or other interface for Microsoft Word® to provide instructions and graphical interface elements for the subject matter described above to integrate with Word's® track changes editing feature to expand the features of track changes and provide for an enhanced way to filter the edits that are made in a document to a selected user's content, a selected editor's edits, previous versions of edits, and/or the like. Other integrations that the integration module 310 may provide include providing the features of the document management apparatus 104 as a plugin or extension to a web browser or online document editor, as a mobile application, and/or the like.

Figure 4:
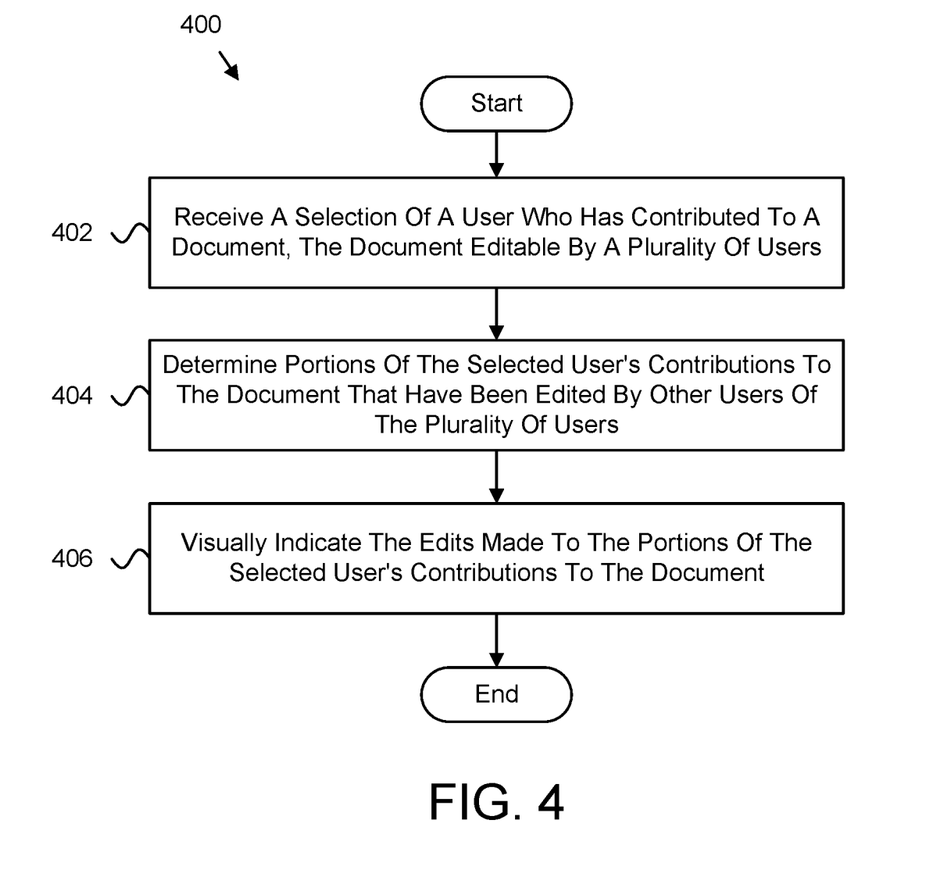
FIG. 4 is a schematic flow chart diagram illustrating one embodiment of a method for displaying edits for a user's portion of a shared document.

FIG. 4 is a schematic flow chart diagram illustrating one embodiment of a method 400 for displaying edits for a user's portion of a shared document. In one embodiment, the method 400 begins and receives 402 a selection of a user who has contributed to a document, which is editable by a plurality of users. In further embodiments, the method 400 determines 404 portions of the selected user's contributions to the document that have been edited by other users of the plurality of users.

In certain embodiments, the method 400 visually indicates 406 the edits made to the portions of the selected user's contributions to the document, and the method 400 ends. In one embodiment, the user selection module 202, the portion determination module 20, and the indicator module 206 perform the various steps of the method 400.

Figure 5:
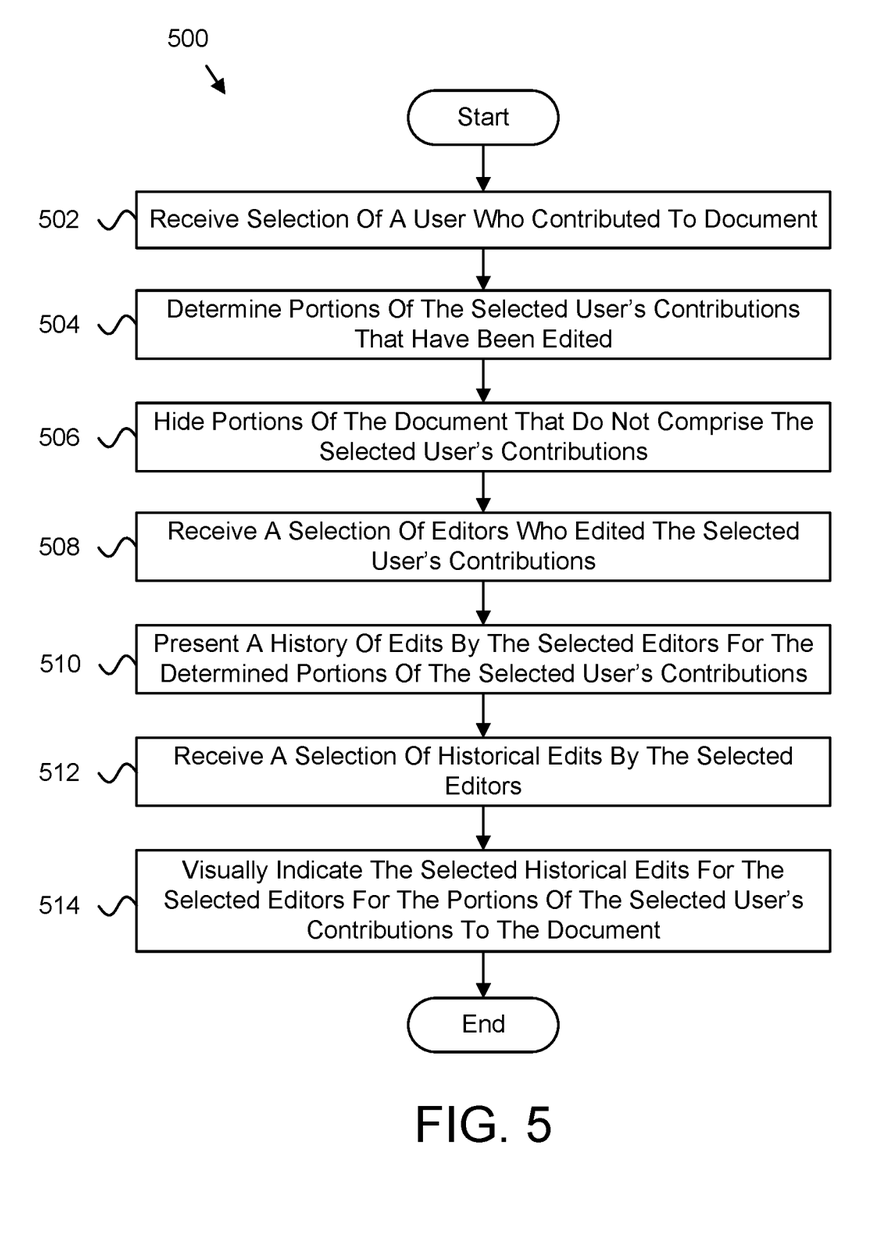
FIG. 5 is a schematic flow chart diagram illustrating one embodiment of another method for displaying edits for a user's portion of a shared document.

FIG. 5 is a schematic flow chart diagram illustrating one embodiment of another method 500 for displaying edits for a user's portion of a shared document. In one embodiment, the method 500 begins and receives 502 a selection of a user who contributed content to a document, such as new, unedited content or an edit to existing content. In further embodiments, the method 500 determines 504 portions of the selected user's contributions that have been edited.

In one embodiment, the method 500 hides 506 portions of the document that do not comprise the selected user's contributions. In some embodiments, the method 500 receives 508 a selection of editors who edited the selected user's contributions, e.g., from a list of presented editors, and presents 510 a history of edits by the selected editors for the determined portions of the selected user's contributions.

In certain embodiments, the method 500 receives 512 a selection of historical edits by the selected editors and visually indicates 514 the selected historical edits for the selected editors for the portions of the selected user's contributions to the document, and the method 500 ends. In one embodiment, the user selection module 202, the portion determination module 204, the indicator module 206, the history module 302, the editor selection module 304, and the presentation module 308 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
receive from each of a plurality of original authors, respective one or more original content for one or more portions of a document, wherein each original content of the one or more original content is new and unedited content that was absent in the content existing in the document prior to receiving a contribution of the respective original content from the respective original author,
receive a selection of an original author from a list comprising the plurality of original authors, wherein:
a first original content comprises all the original content contributed by the selected original author,
a second original content comprises all the original content contributed by each of the other original authors of the plurality of original authors other than the selected original author, and
the document is editable by a plurality of editors;
determine at least one portion of the document that comprises the first original content and that has been edited by at least one editor of the plurality of editors after the selected original author contributed the first original content to the document;
determine all edits made to the first original content and that has been edited by one or more editors of the plurality of editors after the selected original author contributed the first original content to the document;
determine all edits made by the selected original author to the second original content after each contribution of second original content;
visually display all of the first original content to the document;
visually display each of the determined edits made by the plurality of editors to the first original content;
visually display each of the determined edits made by the selected original author to the second original content;
hide all of the second original content;
hide all edits to the second original content that are not made by the selected original author; and hide all edits to the document that are made to the second original content by users other than the selected original author, wherein only the first original content contributed by the selected original author, edits to the document made by the selected original author, and edits to the first original content made by the one or more editors, are visually displayed.

2. The apparatus of claim 1, wherein the code is executable by the processor to:

present a history of edits that have been made by the selected original author to a portion of the document, the historical edits presented in an order in which the edits were made;

receive a selection of an historical edit; and visually indicate the selected historical edit made to the portion of the document made by the selected original author.

3. The apparatus of claim 2, wherein the code is executable by the processor to visually indicate each of one or more edits that have been made to the portion of the document made by the selected original author since the selected historical edit.

4. The apparatus of claim 2, wherein the history of edits comprises a time stamp associated with each of the edits indicating when each edit was made to the portion of the document made by the selected original author.

5. The apparatus of claim 1, wherein the code is executable by the processor to:

receive a selection of one or more editors of the plurality of editors who edited one or more portions of the first original content contributed to the document by the selected original author; and in response to the selection of one or more editors, visually indicate each of the edits made to the one or more portions of the first original content made by the selected one or more editors.

6. The apparatus of claim 1, wherein the first original content made by the selected original author comprises one of: one or more pages, one or more paragraphs and one or more sentences.

7. The apparatus of claim 1, wherein the code is executable by the processor to:

tag a user-selected portion of the document as a portion to monitor; and send a notification to the selected original author in response to detecting an edit made to the tagged user-selected portion of the document.

8. The apparatus of claim 1, wherein the code is executable by the processor to:

automatically tag one or more portions of the document as portions to monitor in response to a user making a threshold amount of edits with each of the one or more portions of the document; and send a notification to the selected original author in response to detecting an edit made to the tagged one or more portions of the document.

9. The apparatus of claim 1, wherein one of:

each contribution to the document made by any other author besides the selected original author is hidden from view until the selected original author is no longer selected; and each edit to each portion of the document made by any other author besides the original author is hidden from view until the selected original author is no longer selected.

10. The apparatus of claim 1, wherein the code is executable by the processor to integrate with a graphical word processing program and present one or more graphical interface elements within the word processing program for performing functions of the apparatus.

11. The apparatus of claim 1, wherein the edits made to the first original content of the document contributed by the selected original author are visually indicated by one or more of a font color, a font style, a tool tip, a highlight, a list, and a pop up window.

12. A method, comprising:

receiving from each of a plurality of original authors, respective one or more original content for one or more portions of a document, wherein each original content of the one or more original content is new and unedited content that was absent in the content existing in the document prior to receiving a contribution of the respective original content from the respective original author;

receiving a selection of an original author from a list comprising the plurality of original authors, wherein:

a first original content comprises all the original content contributed by the selected original author, a second original content comprises all the original content contributed by each of the other original authors of the plurality of original authors other than the selected original author, and the document is editable by a plurality of editors;

determining at least one portion of the document that comprises the first original content and that has been edited by at least one editor of the plurality of editors after the selected original author contributed the first original content to the document;

determining all edits made to the first original content and that has been edited by one or more editors of the plurality of editors after the selected original author contributed the first original content to the document;

determining all edits made by the selected original author to the second original content after each contribution of second original content;

visually displaying all of the first original content to the document;

visually display each of the determined edits made by the plurality of editors to the first original content;

visually displaying each of the determined edits made by the selected original author to the second original content;

hiding all of the second original content;

hiding all edits to the second original content that are not made by the selected original author; and hiding all edits to the document that are made to the second original content by user other than the selected original author, wherein only the first original content contributed by the selected original author, edits to the document made by the selected original author, and edits to the first original content made by the one or more editors, are visually displayed.

13. The method of claim 12, further comprising:

presenting a history of edits that have been made by the selected original author to a portion of the document, the historical edits presented in an order in which the edits were made;

receiving a selection of an historical edit; and visually indicating the selected historical edit made to the portion of the document made by the selected original author.

14. The method of claim 13, further comprising visually indicating each of one or more edits that have been made to the portion of the document made by the selected original author since the selected historical edit.

15. The method of claim 12, further comprising:
receiving a selection of one or more editors of the plurality of editors who edited one or more portions of the first original content contributed to the document by the selected original author; and
in response to the selection of one or more editors, visually indicate each of the edits made to the one or more portions of the first original content made by the selected one or more editors.

16. The method of claim 12, further comprising:
automatically tagging one or more portions of the document as portions to monitor in response to a user interacting with the one or more portions of a threshold amount; and
sending a notification in response to detecting an edit made to the tagged one or more portions of the document.

17. A computer program product, comprising a non-transitory computer readable storage medium having program instructions embodied therewith, the program instructions executable by a processor to cause the processor to:
receive from each of a plurality of original authors, respective one or more original content for one or more portions of a document, wherein each original content of the one or more original content is new and unedited content that was absent in the content existing in the document prior to receiving a contribution of the respective original content from the respective original author;
receive a selection of an original author from a list comprising the plurality of original authors, wherein:
a first original content comprises all the original content contributed by the selected original author,
a second original content comprises all the original content contributed by each of the other original authors of the plurality of original authors other than the selected original author, and the document is editable by a plurality of editors;
determine at least one portion of the document that comprises the first original content and that has been edited by at least one editor of the plurality of editors after the selected original author contributed the first original content to the document;
determine all edits made to the first original content and that has been edited by one or more editors of the plurality of editors after the selected original author contributed the first original content to the document;
determine all edits made by the selected original author to the second original content after each contribution of second original content;
visually display all of the first original content to the document;
visually display each of the determined edits made by the plurality of editors to the first original content;
visually display each of the determined edits made by the selected original author to the second original content;
hide all of the second original content;
hide all edits to the second original content that are not made by the selected original author; and
hide all edits to the document that are made to the second original content by users other than the selected original author,
wherein only the first original content contributed by the selected original author, edits to the document made by the selected original author, and edits to the first original content made by the one or more editors, are visually displayed.

18. The method of claim 13, wherein the history of edits comprises a time stamp associated with each of the edits indicating when each edit was made to the portion of the document made by the selected original author.

19. The method of claim 12, wherein one of:
each contribution to the document made by any other author besides the selected original author is hidden from view until the selected original author is no longer selected; and
each edit to each portion of the document made by any other author besides the original author is hidden from view until the selected original author is no longer selected.

20. The method of claim 12, wherein the edits made to the first original content of the document contributed by the selected original author are visually indicated by one or more of a font color, a font style, a tool tip, a highlight, a list, and a pop up window.

* * * * *